(12) United States Patent
Hirai et al.

(10) Patent No.: US 7,961,250 B2
(45) Date of Patent: Jun. 14, 2011

(54) PHOTOGRAPHING APPARATUS HAVING AN EXPOSURE MODE SELECTION FUNCTION

(75) Inventors: Isamu Hirai, Tokyo (JP); Tadahisa Ohkura, Saitama (JP); Toshihiro Hamamura, Tokyo (JP)

(73) Assignee: Hoya Corporation, Tokyo (JP)

( * ) Notice: Subject to any disclaimer, the term of this patent is extended or adjusted under 35 U.S.C. 154(b) by 889 days.

(21) Appl. No.: 11/853,863

(22) Filed: Sep. 12, 2007

(65) Prior Publication Data
US 2008/0062276 A1  Mar. 13, 2008

(30) Foreign Application Priority Data

Sep. 13, 2006  (JP) .................................. 2006-247849

(51) Int. Cl.
*H04N 5/225* (2006.01)
*H04N 5/238* (2006.01)
*H04N 5/243* (2006.01)

(52) U.S. Cl. ..................................... 348/376; 348/230.1

(58) Field of Classification Search ............... 348/229.1, 348/230.1, 254, 255, 373, 376
See application file for complete search history.

(56) References Cited

U.S. PATENT DOCUMENTS

| 2003/0117519 | A1* | 6/2003 | Wakabayashi | 348/364 |
| 2004/0239769 | A1* | 12/2004 | Tojo | 348/207.99 |
| 2005/0248660 | A1* | 11/2005 | Stavely et al. | 348/208.16 |
| 2008/0049136 | A1* | 2/2008 | Ishibashi | 348/333.09 |

FOREIGN PATENT DOCUMENTS

| JP | 2001103366 | 4/2001 |
| JP | 200429423 | 1/2004 |
| JP | 2004-104673 | 4/2004 |

OTHER PUBLICATIONS

Canon Inc., "Canon EOS 5D Instruction Manual", 2005, pp. 1,2,4,5,14,15,18,32,60,81,84-86,89-91,161,180.*
English language Abstract of JP 2001-103366.
English language Abstract of JP 2004-29423.
U.S. Appl. No. 11/853,878 to Hirai et al., filed on Sep. 12, 2007.

* cited by examiner

*Primary Examiner* — Jason Whipkey
(74) *Attorney, Agent, or Firm* — Greenblum & Bernstein, P.L.C.

(57) ABSTRACT

A photographing apparatus comprises an imaging sensor, a controller, and an exposure-mode-selecting device. The controller performs a photometric operation on a photographing subject and obtains a luminance value of the photographing subject based on the photometric operation. The exposure-mode-selecting device is used for selecting an exposure mode of the photographing apparatus that has a sensitivity priority AE mode. The photographing operation is performed with a sensitivity of the imaging sensor that is set by a user and a shutter speed and an aperture value that are calculated based on the luminance value and the sensitivity, while the photographing apparatus is in the sensitivity priority AE mode.

5 Claims, 6 Drawing Sheets

PHOTOGRAPHING APPARATUS HAVING AN EXPOSURE MODE SELECTION FUNCTION

BACKGROUND OF THE INVENTION

1. Field of the Invention

The present invention relates to a photographing apparatus, and in particular to an apparatus of which a photographing operation has an exposure mode controlling the sensitivity of an imaging sensor.

2. Description of the Related Art

A photographing apparatus that has a program AE mode where the photographing operation is performed with a calculated shutter speed and a calculated aperture value based on a luminance value of the photographing subject.

Japanese unexamined patent publication (KOKAI) No. 2001-103366, discloses a photographing apparatus that calculates the shutter speed and the aperture value according to a proper program line among the plurality of program lines.

In this photographing apparatus, the shutter speed and the aperture value can be calculated corresponding to the sensitivity of the imaging sensor that is set by the user. However, it is necessary to operate the plurality of operation keys for setting the sensitivity, thus making the operation of the photographing apparatus unnecessarily complicated.

SUMMARY OF THE INVENTION

Therefore, an object of the present invention is to provide a photographing apparatus of which the sensitivity of the imaging sensor can be set by a quick and easy operation so that the shutter speed and the aperture value can be calculated corresponding to the set sensitivity.

According to the present invention, a photographing apparatus comprises an imaging sensor, a controller, and an exposure-mode-selecting device. The controller performs a photometric operation on a photographing subject and obtains a luminance value of the photographing subject based on the photometric operation. The exposure-mode-selecting device is used for selecting an exposure mode of the photographing apparatus that has a sensitivity priority AE mode. The photographing operation is performed with a sensitivity of the imaging sensor that is set by a user and a shutter speed and an aperture value that are calculated based on the luminance value and the sensitivity, while the photographing apparatus is in the sensitivity priority AE mode.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
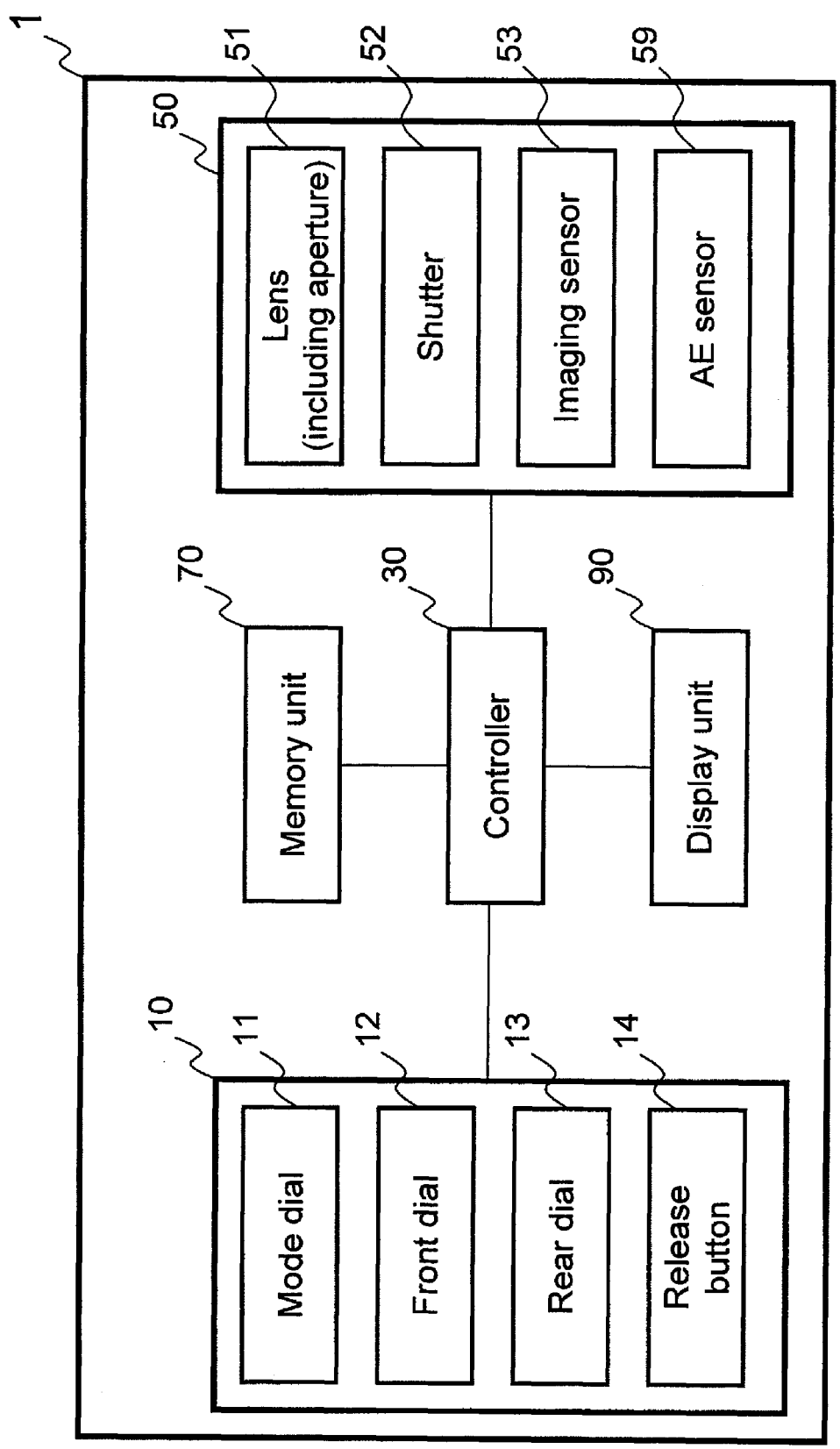
FIG. 1 is a block diagram of the photographing apparatus in the embodiment.

The present invention is described below with reference to the embodiment shown in the drawings. In this embodiment, the photographing apparatus 1 is a digital camera.

The imaging part of the photographing apparatus 1 comprises an operation unit 10, a controller 30, a photographing unit 50, a memory unit 70, and a display unit 90 (see FIG. 1).

Figure 2:
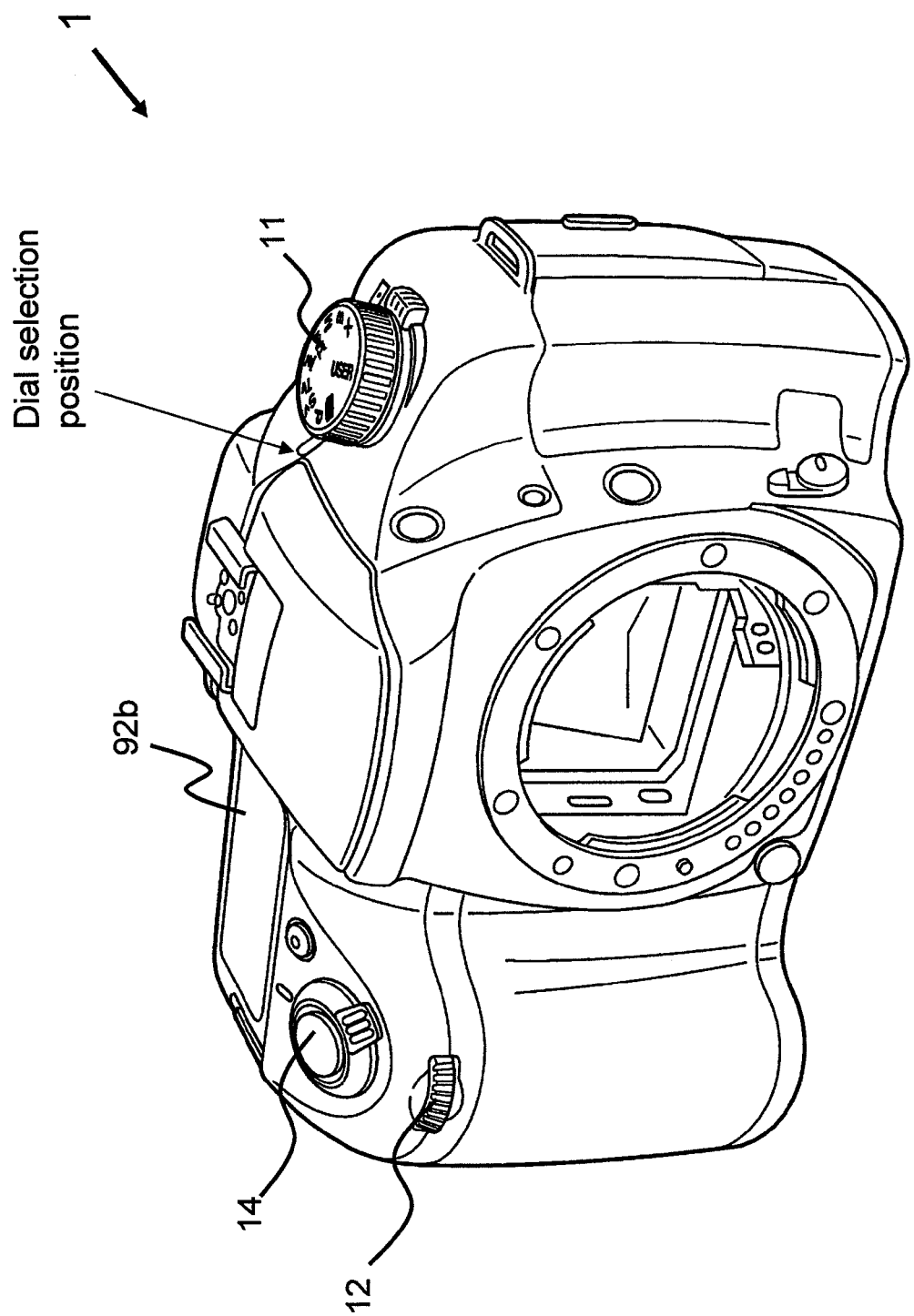
FIG. 2 is a perspective front view of the photographing apparatus.
Figure 3:
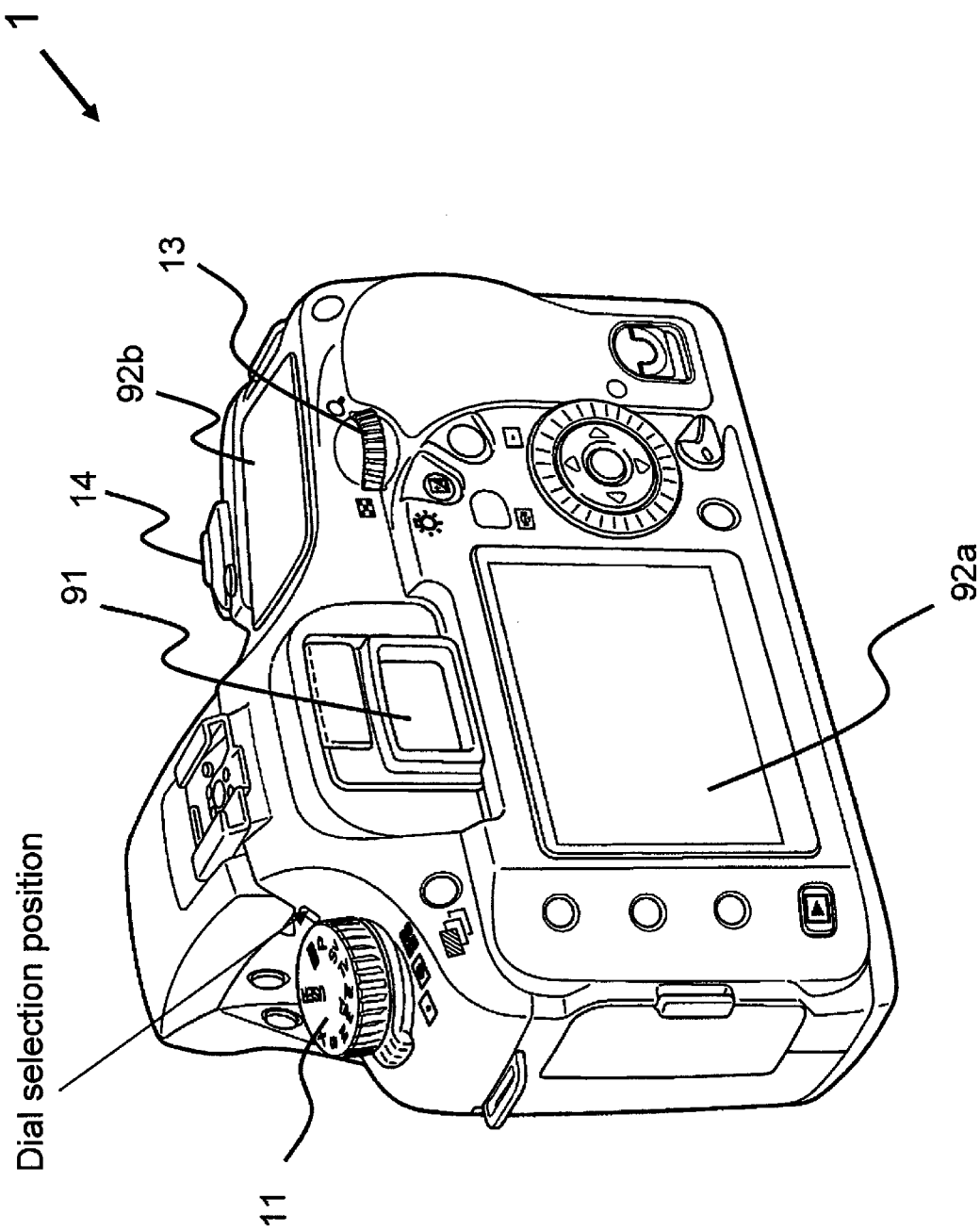
FIG. 3 is a perspective rear view of the photographing apparatus.

The operation unit 10 has a mode dial 11 that changes the exposure mode (sets an exposure factor that can be manually set), a front dial (an exposure-factor-setting device) 12 that sets the shutter speed and the EV compensation value for an exposure compensation operation, a rear dial (an exposure-factor-setting device) 13 that sets the aperture and sensitivity values, and a release button 14 (see FIGS. 2 and 3).

The photographing unit 50 has a lens 51 including an aperture, a shutter 52, an imaging sensor 53 such as a CCD etc., and an AE sensor 59.

The display unit 90 has an optical finder 91, a first display 92a, and a second display 92b.

The front dial 12 is an electrical dial and is a discoid operation member that can be rotatably operated. The bottom of the front dial 12 has a code board (not depicted), and the controller 30 changes the value of a parameter corresponding to the rotation position and the rotation direction of the front dial 12 based on a signal from the code board.

The rear dial 13 is an electrical dial and is a discoid operation member that can be rotatably operated. The bottom of the rear dial 13 has a code board (not depicted), and the controller 30 changes the value of a parameter corresponding to the rotation position and the rotation direction of the rear dial 13 based on a signal from the code board.

In a photographing operation, the photographic subject image is captured as an optical image through the lens 51 and the shutter 52 by the imaging sensor 53 so that the image obtained by the photographing operation is displayed on the first display 92a and the image data obtained by the photographing operation is stored in the memory unit 70.

The exposure condition of the photographing operation, which includes a shutter speed (the length of an exposure time), an aperture value, and a sensitivity (a photographic speed) of the imaging sensor 53, is determined by at least one manual setting operation of the operation unit 10 by the user and an AE calculation by the controller 30 based on a setting condition applied by the user and information regarding a photometric operation from an AE sensor 59.

The photographic subject image can be optically observed through the lens 51 with the optical finder 91.

The mode dial (the exposure-mode-selecting device) 11 is used for selecting the exposure mode, or for setting one of the shutter speed, the aperture value, and the sensitivity of the imaging sensor 53 as an exposure factor that can be manually set based on an operation state of the mode dial 11. For the exposure mode, the photographing apparatus 1 (the mode dial 11) has a first program AE mode P1, a second program AE mode P2, a sensitivity priority AE mode Sv, a shutter speed priority AE mode Tv, an aperture priority AE mode Av, a shutter speed and aperture priority AE mode TAv, a manual mode M, a bulb mode B, and a flash synchronizing mode X.

However, the selecting device for the exposure mode is not limited to the mode dial 11, and may be another selecting device, such as a switch.

The front dial 12 is used for changing the value of the exposure factor set by the mode dial 11 (the shutter speed), based on an operation state of the front dial 12.

The rear dial (the operation device) 13 is used for changing the value of the exposure factor set by the mode dial 11 (the aperture value or the sensitivity), based on an operation state of the rear dial 13. However, the operation device for the aperture value and the sensitivity is not limited to the rear dial 13, and may be another operation device, such as a switch.

The mode dial 11 is rotated so that the exposure mode, corresponding to a mode mark that is moved to a dial selection position by the rotating operation of the mode dial 11, is an exposure mode in which the photographing apparatus 1 is set.

A black rectangular mark corresponding to the first program AE mode P1, a "P" mark corresponding to the second program AE mode P2, an "Sv" mark corresponding to the sensitivity priority AE mode Sv, a "Tv" mark corresponding to the shutter speed priority AE mode Tv, an "Av" mark corresponding to the aperture priority AE mode Av, a "TAv" mark corresponding to the shutter speed and aperture priority AE mode TAv, an "M" mark corresponding to the manual mode M, a "B" mark corresponding to the bulb mode B, and an "X" mark corresponding to the flash synchronizing mode X are indicated on the mode dial 11, as shown in FIGS. 2 and 3.

A state where the "Sv" mark is adjusted to the dial selection position is shown in FIG. 2. A state where the black rectangular mark is adjusted to the dial selection position is shown in FIG. 3.

While the photographing apparatus 1 is in the first program AE mode P1, the controller 30 automatically sets the shutter speed and the aperture value according to a program line of preset parameters to obtain the proper exposure when the photographing operation is performed (when taking pictures).

The first program AE mode P1 is an exposure mode where the photographing operation is performed by using a shutter speed (a Tv value) and an aperture value (an Av value) that are calculated to obtain a proper exposure by the controller 30, based on an exposure value (an Ev value) that is determined on the basis of a luminance value (a Bv value) of the photographing subject, that is obtained in the photometric operation and a predetermined sensitivity (an Sv value) of the imaging sensor 53 that is set in advance.

Figure 4:
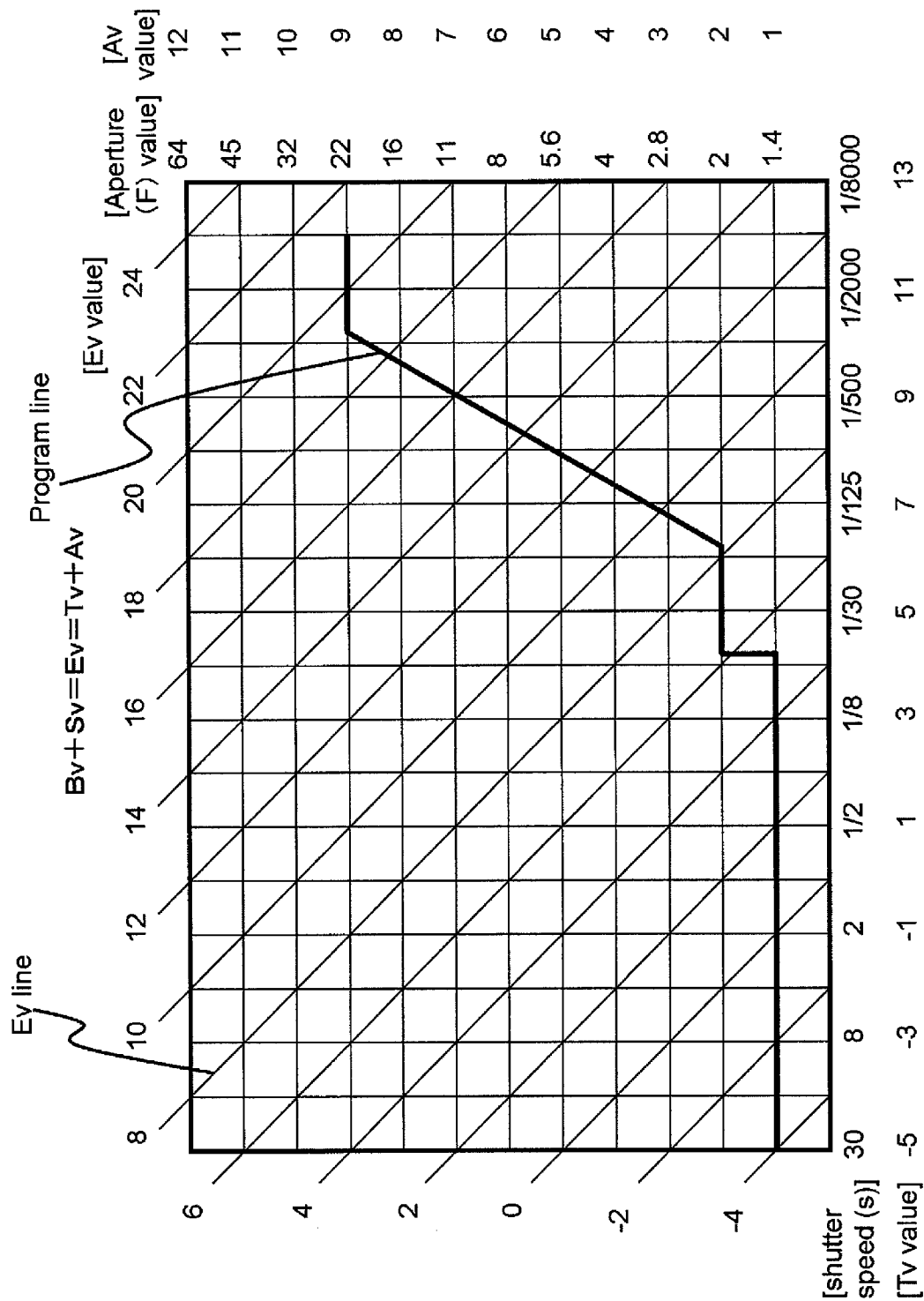
FIG. 4 is a program diagram of the photographing apparatus with the lens.

Specifically, a combination of the shutter speed (the Tv value) and the aperture value (the Av value) corresponding to the exposure value (the Ev value), on the basis of the luminance value (the Bv value) of the photographing subject and the sensitivity (the Sv value) of the imaging sensor 53, is determined according to the program line that is set in the memory of the photographing apparatus 1 in advance (Bv+Sv=Ev=Tv+Av, see FIG. 4).

Further, when the exposure compensation operation is performed by the user, an exposure value that is changed by the exposure compensation operation is used as the Ev value.

While the photographing apparatus 1 is in the second program AE mode P2, the controller 30 automatically sets the shutter speed and the aperture value according to the program line to obtain the proper exposure when the photographing operation is performed (when taking pictures), as in the first program AE mode P1.

Further, in the second program AE mode P2, the shutter speed can be changed by using the front dial 12 and the aperture value can be changed by using the rear dial 13, while still maintaining the proper exposure.

When the shutter speed is changed, the controller 30 recalculates the aperture value, based on the modified shutter speed to obtain the proper exposure.

When the aperture value is changed, the controller 30 recalculates the shutter speed, based on the modified aperture value to obtain the proper exposure.

In this way, the fact that either or both the shutter speed (Tv value) and the aperture value (Av value) can be optionally changed is a difference from the first program AE mode P1.

While the photographing apparatus 1 is in the sensitivity priority AE mode Sv, the controller 30 automatically sets the shutter speed and the aperture value according to a set sensitivity to obtain the proper exposure when the photographing operation is performed (when taking pictures).

The sensitivity priority AE mode Sv is an exposure mode where the photographing operation is performed by using a shutter speed (the Tv value) and an aperture value (the Av value) that are calculated to obtain a proper exposure by the controller 30, based on an exposure value that is determined on the basis of the luminance value (the Bv value) of the photographing subject that is obtained in the photometric operation, and the sensitivity (the Sv value) of the imaging sensor 53 that is set, by the user using the rear dial 13.

Specifically, the combination of the shutter speed (the Tv value) and the aperture value (the Av value), corresponding to the exposure value (the Ev value) that is based on the luminance value (the Bv value) of the photographing subject and the sensitivity (the Sv value) of the imaging sensor 53, is determined according to the program line that is set, in advance, in the memory of the photographing apparatus 1, and an EV line corresponding to the Ev value, that is calculated.

The Ev line is expressed in diagonal lines in the program diagram of FIG. 4.

In the case that the photographing apparatus 1 is a digital camera, the sensitivity (the Sv value) corresponds to a gain applied to the image signal output from the imaging sensor 53, and the controller 30 performs the photographing operation under the condition where the sensitivity is set higher so that the gain applied to the image signal is set higher. Therefore, noise in the image corresponding to the image signal is also amplified more as the gain is increased.

Accordingly, it is suitable to use the sensitivity priority AE mode Sv in the case where the user intends to change the image quality while maintaining the sensitivity for image-creating (framing) intention.

When the luminance value (the Bv value) of the photographing subject is constant (is not changed), the exposure value (the Ev value) is altered corresponding to the modified sensitivity (the Sv value) that is manually set by the user, so that the combination of the calculated shutter speed (the Tv value) and the calculated aperture value (the Av value) is modified.

Further, in the sensitivity priority AE mode Sv, the shutter speed can be changed by using the front dial 12 while still maintaining the proper exposure.

When the shutter speed is changed, the controller 30 recalculates the aperture value based on the modified shutter speed to obtain the proper exposure.

In this way, when the combination of the shutter speed and the aperture value that is calculated corresponding to the sensitivity that is set by the user does not satisfy the user's requirements, one of the exposure factors (the shutter speed) can be changed easily, so that a photographing operation suitable for the user's intention can be performed.

While the photographing apparatus 1 is in the shutter speed priority AE mode Tv, the controller 30 automatically sets the aperture value according to a set shutter speed to obtain the proper exposure when the photographing operation is performed (when taking pictures).

The shutter speed priority AE mode Tv is an exposure mode where the photographing operation is performed using a shutter speed (the Tv value) that is set with the front dial 12 by the user, and an aperture value (the Av value) that is calculated by the controller 30 to obtain a proper exposure based on the set shutter speed and the exposure value (the Ev value). The Ev value is determined on the basis of the luminance value (the Bv value) of the photographing subject that is obtained in the photometric operation, and the sensitivity (the Sv value) of the imaging sensor 53 that is set in advance.

While the photographing apparatus 1 is in the aperture priority AE mode Av, the controller 30 automatically sets the shutter speed according to a set aperture value to obtain the proper exposure when the photographing operation is performed (when taking pictures).

The aperture priority AE mode Av is an exposure mode where the photographing operation is performed using an aperture value (the Av value) that is set with the rear dial 13 by the user, and a shutter speed (the Tv value) that is calculated by the controller 30 to obtain a proper exposure based on the set aperture value and the exposure value (the Ev value). The Ev value is determined on the basis of the luminance value (the Bv value) of the photographing subject that is obtained in the photometric operation, and the sensitivity (the Sv value) of the imaging sensor 53 that is set in advance.

While the photographing apparatus 1 is in the shutter speed and aperture priority AE mode TAv, the controller 30 automatically sets the sensitivity according to a set shutter speed and a set aperture value to obtain the proper exposure when the photographing operation is performed (when taking pictures).

The shutter speed and aperture priority AE mode TAv is an exposure mode where the photographing operation is performed using a shutter speed (the Tv value) that is set with the front dial 12 by the user and an aperture value (the Av value) that is set with the rear dial 13 by the user, with the sensitivity (the Sv value) of the imaging sensor 53 that is calculated by the controller 30 to obtain the proper exposure based on the set shutter speed, the set aperture value, and the luminance value (the Bv value) of the photographing subject that is obtained in the photometric operation.

Specifically, the exposure value (the Ev value) is calculated based on the shutter speed (the Tv value) and the aperture value (the Av value) that are set by the user (Ev=Tv+Av). Then, the sensitivity (the Sv value) of the imaging sensor 53 corresponding to the calculated exposure value (the Ev value) is determined based on the luminance value (the Bv value) of the photographing subject that is obtained in the photometric operation (Sv=Ev−Bv).

For example, it is explained that in the case where the weather turns from being cloudy to being fine, the light of the sun that radiates to the photographing subject is increased, and subsequentily, the value 2 EV of the luminance value (the Bv value) is increased. In this case, because the exposure value (the Ev value), on the basis of the shutter speed (the Tv value) and the aperture value (the Av value) which are set by the user, is not changed in the shutter speed and aperture priority AE mode TAv, the value 2 EV of the sensitivity (the Sv value) is decreased corresponding to the luminance value (the Bv value) being increased in order to obtain a proper exposure.

The manual mode M is an exposure mode where the photographing operation is performed using a shutter speed (the Tv value) that is set with the front dial 12 by the user, an aperture value (the Av value) that is set with the rear dial 13 by the user, with the sensitivity (the Sv value) of the imaging sensor 53 that is set by the user.

The bulb mode B is an exposure mode where the photographing operation is performed using an aperture value (the Av value) that is set with the rear dial 13 by the user, with a sensitivity (the Sv value) of the imaging sensor 53 that is set by the user, while the release button 14 is fully depressed.

The flash synchronizing mode X is an exposure mode where the photographing operation is performed using an aperture value (the Av value) that is set with the rear dial 13 by the user, and a shutter speed (the Tv value) that is calculated by the controller 30 to obtain a proper exposure based on the set aperture value and the exposure value (the Ev value). The Ev value is determined on the basis of the luminance value (the Bv value) of the photographing subject with the use of a flash of light. The shutter speed is obtained in the photometric operation with a sensitivity (the Sv value) of the imaging sensor 53 that is set in advance. In this mode, the shutter speed (the Tv value) is set to be less than a shutter speed that can be synchronized with the flash of light operation that is preset in the photographing apparatus 1 in advance.

The front dial 12 is an electrical dial that is arranged on the front grip part of the photographing apparatus 1, whereby the front dial 12 can be rotated by the user's right forefinger, etc., while holding the photographing apparatus 1.

By rotating the front dial 12, the shutter speed can be changed in the second program AE mode P2, the shutter speed priority AE mode Tv, the shutter speed and aperture priority mode TAv, and the manual mode M.

However, the front dial 12 may be used for another adjusting operation, such as setting the EV compensation, or setting the number of photographing operations of the auto bracket function.

The rear dial 13 is an electrical dial that is arranged on the right rear surface part of the photographing apparatus 1, whereby the rear dial 13 can be rotated by the user's right thumb, etc., while holding the photographing apparatus 1.

By rotating the rear dial 13, the aperture value can be changed in the second program AE mode P2, the aperture priority AE mode Av, the shutter speed and aperture priority mode TAv, the manual mode M, and the flash synchronizing mode X.

Similarly, by rotating the rear dial 13, the sensitivity of the imaging sensor 53 can be changed in the sensitivity priority AE mode Sv.

However, the rear dial 13 may be used for another adjusting operation, such as setting the step interval in the auto bracket function.

When the release button 14 is partially depressed by the user, the photometric switch (not depicted) switches to the ON state so that the photometric operation of the AE sensor 59, the AF sensing operation, and the focusing operation of the AF sensor (not depicted) are performed.

In the first program AE mode P1, the second program AE mode P2, the sensitivity priority AE mode Sv, the shutter speed priority AE mode Tv, the aperture priority AE mode Av, and the shutter speed and aperture priority AE mode TAv, the exposure condition, such as the shutter speed, etc., is calculated based on the luminance value of the photographing subject that is obtained by the controller 30 in the photometric operation.

When the release button 14 is fully depressed by the user, the release switch (not depicted) changes to the ON state so that the controller 30 performs the photographing operation based on the exposure factors, such as the shutter speed, etc., that are automatically calculated by the controller 30 or optionally set by the user. The image, which is captured, is displayed in the first display 92a and the image data is stored in the memory unit 70.

The controller 30 is a control apparatus that controls each part of the photographing apparatus 1 regarding the photographing operation, particularly the AE sensor 59. It also calculates the luminance value of the photographing subject that is obtained by the AE sensor 59 in the photometric operation, and performs the calculation of the exposure condition in the photometric operation corresponding to the exposure mode.

When one of the calculated exposure factors (the shutter speed, the aperture value, or the sensitivity of the imaging sensor 53), is outside of a predetermined range (a range of shutter speed values, aperture values, or sensitivity values), an error message indicating that the proper exposure cannot be obtained is displayed in the exposure condition display area 91a in the optical finder 91, the first display 92a, and the second display 92b.

For example, in the case where a photographing subject that has a high luminance value is detected in the sensitivity priority AE mode Sv, where the sensitivity set by the user is too high (i.e. the Sv value is too large), the calculated value of the shutter speed may be higher than an upper limited value of the shutter speed of the photographing apparatus 1, and the calculated value of the aperture may be more than the most constricted value of the aperture of the lens 51. Because the shutter speed (the Tv value) is set to the upper limited value of the shutter speed of the photographing apparatus 1 and the aperture value (the Av value) is set to the most constricted value of the aperture of the lens 51, proper exposure cannot be obtained in such an exposure condition.

In this case, a flashing signal in the first shutter-speed display area 91a2 and the first aperture-value display area 91a3 of the exposure condition display area 91a of the optical finder 91, or a flashing signal in the second shutter-speed display area 92b2 and the second aperture-value display area 92b3 of the second display 92b warns the user to change the sensitivity (the Sv value) in order to obtain a proper exposure. Specifically, the sensitivity (the Sv value) should be decreased (a lower Sv value).

The optical finder 91 is a finder that is used for observing the optical image of the photographing subject through the lens 51, and for observing the exposure condition as set by the user or calculated by the photometric operation, with one of the user's eyes.

Figure 6:
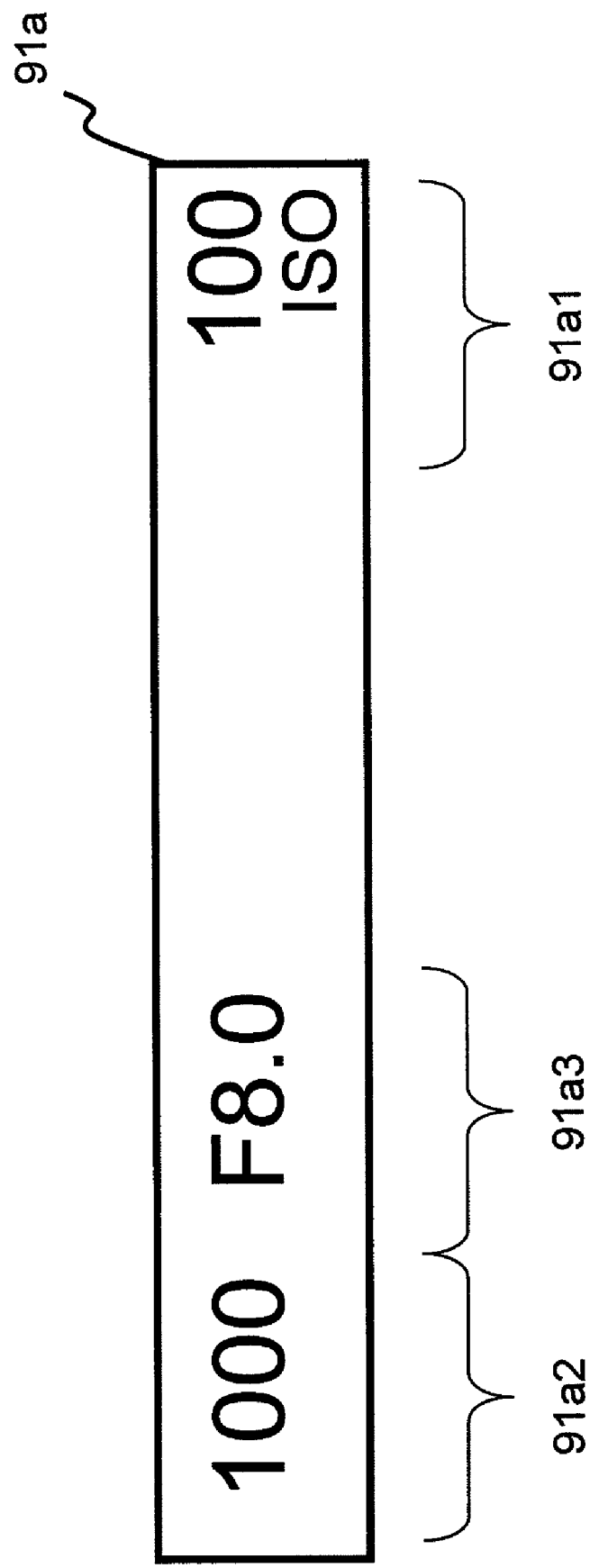
FIG. 6 shows display content that is displayed in the exposure condition display area of the optical finder.

The optical finder 91 has an area that displays the optical image (not depicted) and an exposure condition display area 91a that displays the exposure condition, such as the shutter speed, etc., (see FIG. 6).

The exposure condition display area 91a has a first sensitivity display area 91a1 that displays the sensitivity of the imaging sensor 53, a first shutter-speed display area 91a2 that displays the shutter speed, and a first aperture-value display area 91a3 that displays the aperture value.

The first display 92a is an indicating apparatus arranged on the rear surface of the photographing apparatus 1 that displays the image obtained by the photographing operation and that displays information regarding the function setting, such as the white balance, etc.

The second display 92b is an indicating apparatus arranged on the top surface of the photographing apparatus 1 that displays information about the function that is set, regarding the exposure condition, the image processing operation, such as the white balance, etc., and the storing operation.

Figure 5:
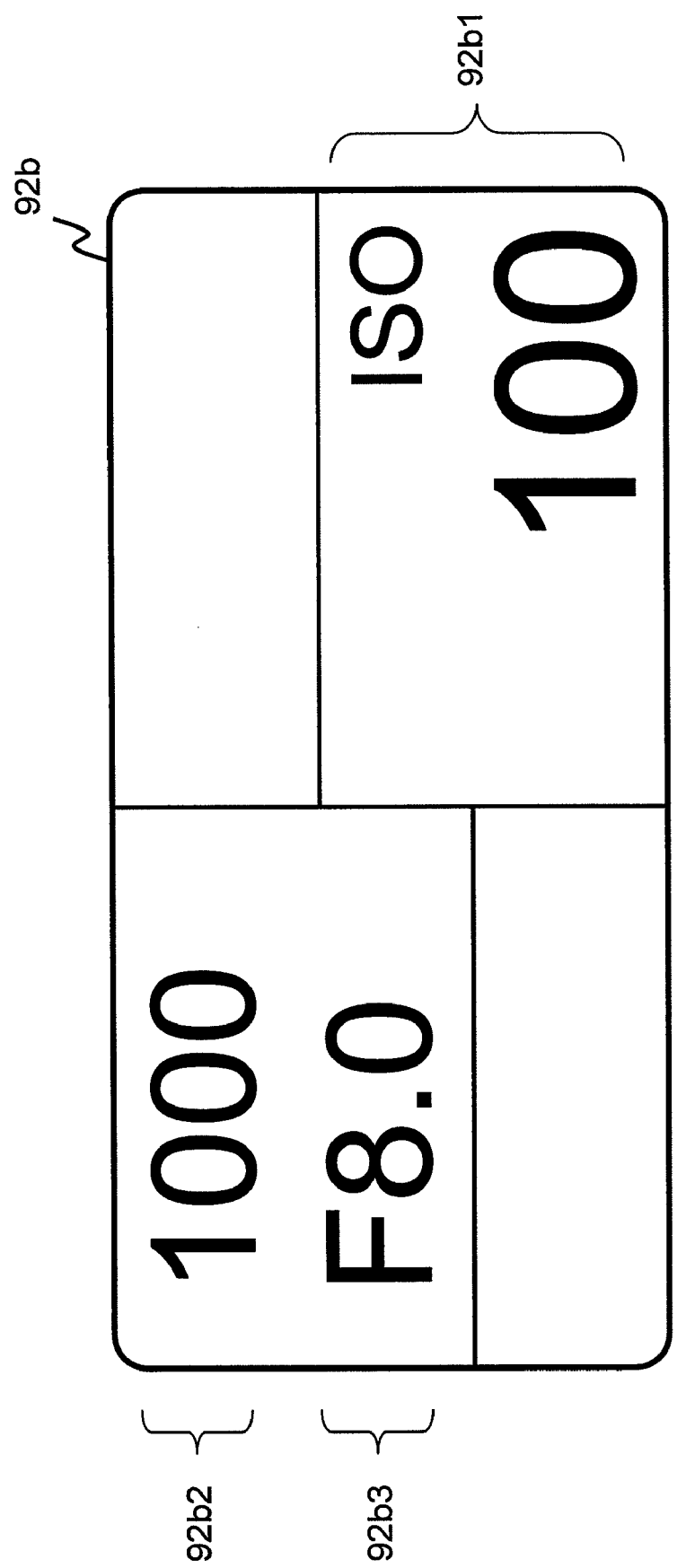
FIG. 5 shows display content that is displayed in the second display.

The second display 92b has a second sensitivity display area 92b1 that displays the sensitivity of the imaging sensor 53, a second shutter-speed display area 92b2 that displays the shutter speed, and a second aperture-value display area 92b3 that displays the aperture value (see FIG. 5).

In the embodiment, the exposure mode of the photographing apparatus 1 has the sensitivity priority AE mode Sv as one of the exposure modes where the sensitivity is manually set by the user so that the shutter speed and the aperture value are calculated based on the set sensitivity.

Therefore, the proper exposure condition (the shutter speed and the aperture value) corresponding to the sensitivity can be calculated so that the photographing operation can be performed with a proper exposure.

For example, it is suitable to use the sensitivity priority AE mode Sv under the condition where priority is given to obtaining the image with low noise. In this situation the photographing operation is performed with the low sensitivity.

Further, the rear dial 13 that is arranged in the rear part of the photographing apparatus 1 is used as a device for setting the sensitivity of the imaging sensor 53. The sensitivity that is set by using the rear dial 13, can be visually recognized on the optical finder 91, the first display 92a, and the second display 92b.

Therefore, when the photographing apparatus 1 is set in the sensitivity priority AE mode Sv, the sensitivity of the imaging sensor 53 can be changed by using only one operation, i.e. the rotation of the rear dial 13.

The prior photographing apparatus has a function for adjusting the sensitivity of the imaging sensor 53, and has a program AE mode as one of its exposure modes. Therefore, an operation that is similar to the sensitivity priority AE mode Sv in the embodiment can be performed by setting the sensitivity of the imaging sensor 53 in the program AE mode.

However, in this case it is necessary to operate a button for starting the adjustment of the sensitivity, manipulate up/down keys or rotate a dial to change the sensitivity, and operate another key for accepting or releasing the setting state. The sensitivity of the imaging sensor 53 cannot be set by using only the one operation.

In the embodiment, the mode dial 11 that is used for selecting the sensitivity priority AE mode Sv is a dial that is used to select the exposure mode, such as the shutter speed priority AE mode Tv etc. The rear dial 13 is a dial that is used for setting the aperture value in the aperture priority AE mode Av etc.

Therefore, it is unnecessary to add an operation key for the sensitivity priority AE mode Sv. It is necessary to add only a new exposure mode on the mode dial 11 and a corresponding function that sets the sensitivity in the sensitivity priority AE mode Sv on a dial for selecting the aperture value etc.

Further, in the sensitivity priority AE mode Sv, the method of setting the sensitivity is the same as the method of setting the aperture value in the aperture priority AE mode Av. Therefore, the operation does not become complicated for the user.

Or, the user operation that manually sets the sensitivity can be the same operation the user uses to manually set the shutter speed and manually set the aperture value. Therefore, the sensitivity can be set quickly and easily, so that the photographing operation with the required sensitivity can be performed.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2006-247849 (filed on Sep. 13, 2006), which is expressly incorporated herein by reference, in its entirety.

The invention claimed is:

1. A photographing apparatus comprising:

an imaging sensor;

a controller that performs a photometric operation on a photographing subject and obtains a luminance value of said photographing subject based on said photometric operation;

an exposure-mode-selecting device that selects one of a plurality of exposure modes in accordance with a position of said exposure-mode-selecting device, said plurality of exposure mode comprising a sensitivity priority AE mode and an aperture priority AE mode, said exposure-mode-selecting device being arranged on an upper surface of said photographing apparatus; and an operation device arranged on a rear surface of said photographing apparatus, said operation device being operated by a user to set a sensitivity of said imaging sensor in said sensitivity priority AE mode, and to set an aperture value in said aperture priority AE mode, wherein a photographing operation is performed with said sensitivity of said imaging sensor that is set by a user and a shutter speed and an aperture value that are calculated based on said luminance value and said sensitivity, while said photographing apparatus is in said sensitivity priority AE mode.

2. The photographing apparatus according to claim 1, wherein said operation device is a dial.

3. The photographing apparatus according to claim 1, further comprising a display that displays at least one error message when either said shutter speed that is calculated in said sensitivity priority AE mode is outside a range of shutter speed values of said photographing apparatus, or when said aperture value that is calculated in said sensitivity priority AE mode is outside a range of aperture values of a lens of said photographing apparatus.

4. A photographing apparatus comprising:

an imaging sensor;

a controller that performs a photometric operation on a photographing subject and obtains a luminance value of said photographing subject based on said photometric operation;

an exposure-mode-selecting device that has a first operation device that selects one of a plurality of exposure modes in accordance with a position of said first operation device, said plurality of exposure modes comprising a sensitivity priority AE mode and an aperture priority AE mode, said first operation device being arranged on an upper surface of said photographing apparatus; and an exposure-factor-setting device that has a second operation device and a third operation device, said second operation device being arranged on a rear surface of said photographing apparatus to set a sensitivity of said imaging sensor in said sensitivity priority AE mode and to set an aperture value in said aperture priority AE mode in accordance with an operation state of said second operation device, said third operation device being arranged on a front surface of said photographing apparatus to change a shutter speed in accordance with an operation state of said third operation device, said controller calculating said shutter speed and said aperture value based on said luminance value and said sensitivity that is set by said second operation device, when said photographing apparatus is in said sensitivity priority AE mode.

5. The photographing apparatus according to claim 4, wherein said controller calculates said aperture value based on said luminance value, said sensitivity, and said shutter speed that is changed by said third operation device, when said third operation device is operated in said sensitivity priority AE mode.

* * * * *